United States Patent [19]

Darga

[11] 4,399,635
[45] Aug. 23, 1983

[54] REMOVABLE GATE

[76] Inventor: August J. Darga, 5886 Shea Rd., Marine City, Mich. 48039

[21] Appl. No.: 405,180

[22] Filed: Aug. 4, 1982

[51] Int. Cl.³ .............................................. E06B 7/00
[52] U.S. Cl. ......................................... 49/57; 49/463
[58] Field of Search ............... 49/57, 56, 55, 50, 463, 49/61, 62; 248/251, 201; 211/105.1, 123; 292/259, 262; 52/106

[56] References Cited

U.S. PATENT DOCUMENTS

| | | | |
|---|---|---|---|
| 377,624 | 2/1888 | Kuenzel | 49/57 |
| 973,733 | 10/1910 | Wilson | 49/57 |
| 999,682 | 8/1911 | Suits | 49/57 |
| 1,148,012 | 7/1915 | Elliott | 49/57 |
| 1,752,683 | 4/1930 | Meagher | 248/251 |
| 2,153,145 | 4/1939 | Gimmelli | 49/463 X |

*Primary Examiner*—Philip C. Kannan
*Attorney, Agent, or Firm*—Charles W. Chandler

[57] ABSTRACT

A gate for a building such as a barn or the like comprising a plurality of vertically spaced, horizontal pipes, and bracket means mounted on opposite sides of the barn opening and supporting the pipes at their respective heights.

1 Claim, 5 Drawing Figures

REMOVABLE GATE

BACKGROUND OF THE INVENTION

This invention is related to gates or closures for building openings such as barns, and more particularly to a removable gate comprising a plurality of vertically spaced, horizontal pipes supported in the building opening.

Conventional barn gates intended to prevent animals from leaving the barn are frequently destroyed by the animals kicking their lower ends adjacent the ground.

SUMMARY OF THE INVENTION

The broad purpose of the present invention is to provide a gate for the doorway of a building, such as a barn, comprising a plurality of vertically spaced horizontal pipes having their ends mounted in bracket fastened to the sides of the doorway in such a way as to permit the user to easily remove one of the pipes while preventing an animal from accidentally releasing the pipe from its horizontal position.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views; and in which.

DESCRIPTION OF THE PREFERRED EMBODIMENT

Figure 1:
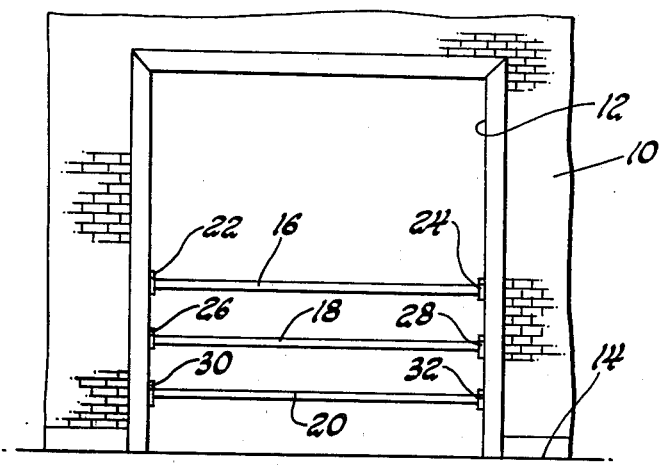
FIG. 1 is a view of a barn doorway having a gate illustrating the preferred embodiment of the invention.

Referring to the drawing, FIG. 1 illustrates a barn 10 having a door opening 12 and ground 14.

Three tubular members, preferably metal pipes 16, 18 and 20 are horizontally mounted in the doorway and vertically spaced, one above the other, as illustrated. Bracket means 22, 24, 26, 28, 30 and 32 mount the ends of the pipes to the vertical sides of the door opening. The bracket means are identical except with respect to their location on the door opening.

Referring to FIGS. 2-5, pipe 16, which is typical of the other pipes, has its right end mounted in bracket means 24 which is typical of the other brackets. Bracket means 24 has a U-shaped body 26 having a base 28 and a pair of legs 30 and 32. Legs 30 and 32 are parallel and preferably mounted in a vertical position to define a top opening 34. The opening between the legs accommodates the outside diameter of pipe 16. The length of each pipe is slightly less than the distance between the vertical sides of opening 12. Each pipe is received into the opening by a downward motion indicated by the arrow 36 in FIG. 3.

Body 26 is fastened to the side of the doorway by fastener means 40. The upper end of leg 32 has a tapped opening 42 while the upper end of leg 30 has a tapped opening 44.

A locking finger 46 has one end pivotally connected by a bolt 48 to leg 32, the lower end of the bolt being received in opening 42. A second bolt 50 is mounted on the other leg, its lower end being received in tapped opening 44 in such a manner that the midsection of the bolt is receivable in a slot 52 carried by the finger.

Figure 2:
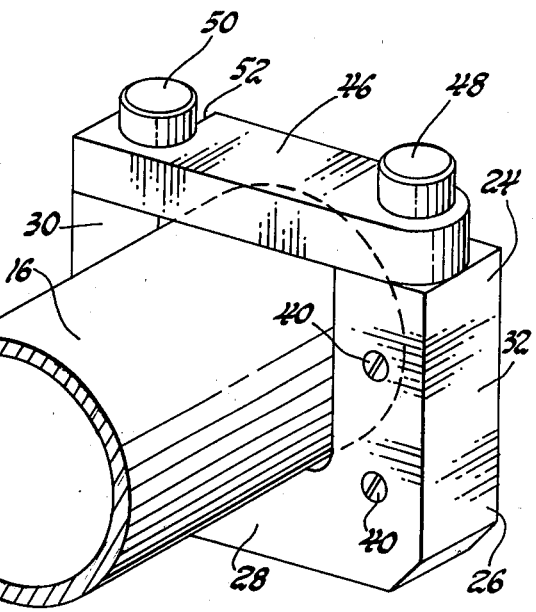
FIG. 2 is an enlarged perspective view of the bracket means supporting the end of one of the pipes.
Figure 4:
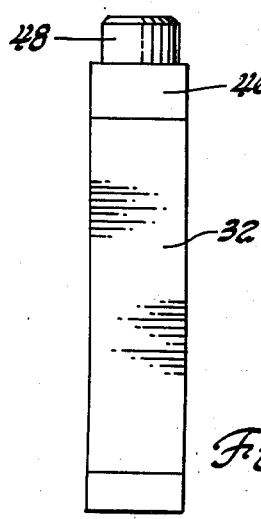
FIG. 4 is a side view of the preferred bracket means.
Figure 3:
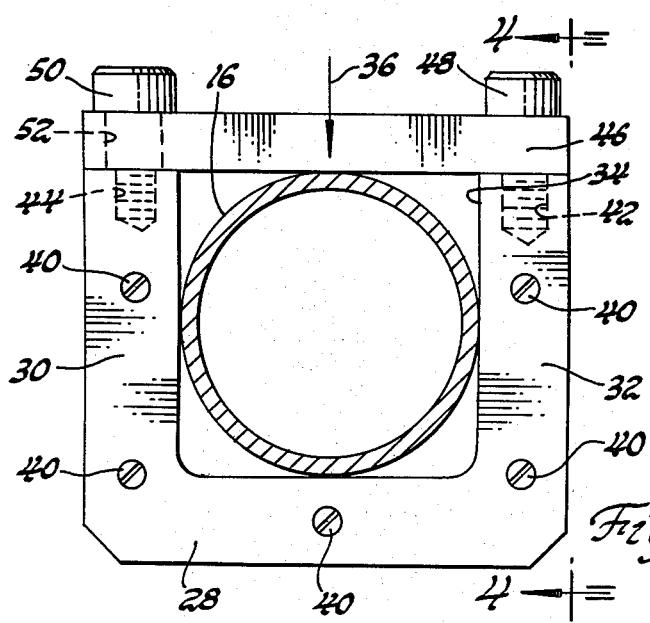
FIG. 3 is a sectional view showing the preferred bracket means.
Figure 5:
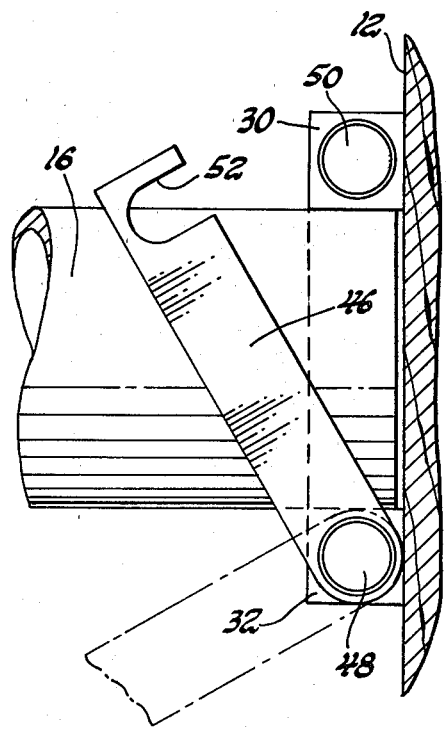
FIG. 5 is a plan view of the bracket means showing a locking finger in its partially opened position.

Referring to FIGS. 2 and 5, the finger is movable between a closed, locking position illustrated in FIG. 2 and an open position in which the pipe is removable from its position between the legs. In its locking position, the finger prevents the rail from being raised upwardly. It is to be noted that the finger is movable in a plane at right angles to the direction 36 of the path of motion of the rail as it is being removed or inserted into the body.

Thus it is to be understood that I have described a gate formed of a plurality of vertically spaced pipes, each rail being readily removed from its supporting brackets. The brackets are formed to prevent an individual pipe from being removed by an animal confined in the barn.

Having described my invention, I claim:

1. In a building having an opening with opposed parallel vertical sides, a gate comprising:

a plurality of horizontal elongated, tubular members each disposed at a selected predetermined height above the ground;

bracket means mounted on the opening sides for supporting each end of said tubular members, the bracket means for at least one end of each tubular member comprising;

a U-shaped body having a base and a pair of legs defining an opening for receiving the end of the tubular member by a motion between the open ends of the legs;

means for fastening the body to the side of the building opening;

a finger mounted on the ends of said pair of legs and spanning the legs to form a closure therebetween;

a pivot member connecting one end of the finger to the end of said legs such that the finger is movable in a plane at right angles to said legs, between an open position permitting the tubular member to be received between the opening between the legs to a position between the legs, and a closed position in which the finger prevents removal of the tubular member from its position between the legs; and the end of the finger having an opening; and fastener means mounted on the opposite leg so as to be receivable in said opening to prevent the finger from moving parallel to the legs to thereby prevent the tubular member from being accidentally removed from its position between the legs.

* * * * *